(12) United States Patent
Su

(10) Patent No.: US 10,341,945 B2
(45) Date of Patent: *Jul. 2, 2019

(54) METHOD AND APPARATUS FOR LTE CELL SEARCH USING MULTIPLE RECEIVERS OF A MOBILE DEVICE

(71) Applicant: Apple Inc., Cupertino, CA (US)

(72) Inventor: Li Su, San Jose, CA (US)

(73) Assignee: Apple Inc., Cupertino, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/827,041

(22) Filed: Nov. 30, 2017

(65) Prior Publication Data

US 2018/0084489 A1 Mar. 22, 2018

Related U.S. Application Data

(63) Continuation of application No. 14/498,879, filed on Sep. 26, 2014, now Pat. No. 9,877,271.

(60) Provisional application No. 61/884,878, filed on Sep. 30, 2013.

(51) Int. Cl.
*H04W 48/16* (2009.01)
*H04W 36/00* (2009.01)

(52) U.S. Cl.
CPC ........ *H04W 48/16* (2013.01); *H04W 36/0022* (2013.01)

(58) Field of Classification Search
CPC .......................... H04W 48/16; H04W 36/0022
See application file for complete search history.

(56) References Cited

U.S. PATENT DOCUMENTS

| | | | |
|---|---|---|---|
| 8,195,166 B1 | 6/2012 | Oprescu-Surcobe et al. | |
| 8,335,536 B2 | 12/2012 | Hirsch et al. | |
| 8,737,355 B2 | 5/2014 | Kumpula et al. | |
| 8,838,120 B2 | 9/2014 | Örjmark et al. | |
| 8,989,145 B2 | 3/2015 | Das et al. | |
| 8,995,370 B2 | 3/2015 | Pelletier et al. | |
| 9,131,476 B2 | 9/2015 | Edara et al. | |
| 9,220,055 B2 | 12/2015 | Shin | |
| 9,456,437 B2 | 9/2016 | De Pasquale et al. | |
| 9,848,340 B2 * | 12/2017 | Kazmi | H04W 48/16 |
| 2005/0085230 A1 | 4/2005 | Welnick et al. | |
| 2007/0237261 A1 * | 10/2007 | Lindoff | H04B 1/001 375/316 |
| 2010/0234026 A1 | 9/2010 | Tenny et al. | |

(Continued)

*Primary Examiner* — Rasheed Gidado
(74) *Attorney, Agent, or Firm* — Dickinson Wright RLLP

(57) ABSTRACT

A method using multiple receivers of a wireless communication device to accelerate cell selection and reselection is disclosed. Multiple receivers of the wireless device are used to implement carrier aggregation in LTE connected mode. The multiple receivers of the wireless device are used to search for cells concurrently across multiple radio frequency bands and/or multiple radio access technologies during cell selection and/or cell reselection procedures. A first receiver and a second receiver of the wireless device each search for cells over different radio frequency bands simultaneously, and accordingly the cell selection and reselection time is effectively reduced compared to using only one receiver. Multiple receivers are also used concurrently, in parallel, to accelerate inter-frequency cell detection and measurement and for inter-RAT searches and measurements.

20 Claims, 9 Drawing Sheets

(56) References Cited

U.S. PATENT DOCUMENTS

| | | | |
|---|---|---|---|
| 2010/0279638 A1* | 11/2010 | Lindoff | H04L 25/0204 |
| | | | 455/226.1 |
| 2011/0128919 A1 | 6/2011 | Kim et al. | |
| 2012/0230268 A1 | 9/2012 | Marinier et al. | |
| 2013/0051362 A1* | 2/2013 | Lee | H04W 36/30 |
| | | | 370/331 |
| 2013/0235740 A1* | 9/2013 | Kim | H04W 36/0022 |
| | | | 370/252 |
| 2013/0324107 A1 | 12/2013 | Lindoff et al. | |
| 2013/0331077 A1 | 12/2013 | Mucke et al. | |
| 2014/0010207 A1* | 1/2014 | Horn | H04W 36/165 |
| | | | 370/332 |
| 2014/0011501 A1 | 1/2014 | Mikami | |
| 2014/0295912 A1 | 10/2014 | Lee | |
| 2014/0315550 A1 | 10/2014 | Ganapathy et al. | |
| 2015/0038137 A1* | 2/2015 | Varshney | H04W 48/16 |
| | | | 455/434 |
| 2015/0092709 A1 | 4/2015 | Su | |
| 2015/0094065 A1 | 4/2015 | Su et al. | |
| 2015/0333880 A1 | 11/2015 | Yi et al. | |

\* cited by examiner

METHOD AND APPARATUS FOR LTE CELL SEARCH USING MULTIPLE RECEIVERS OF A MOBILE DEVICE

CROSS REFERENCE TO RELATED APPLICATIONS

This Application is a continuation of U.S. application Ser. No. 14/498,879, filed Sep. 26, 2014, entitled "METHOD AND APPARATUS FOR LTE CELL SEARCH USING MULTIPLE RECEIVERS OF A MOBILE DEVICE," which claims the benefit of U.S. Provisional Application No. 61/884,878 filed Sep. 30, 2013, entitled "METHOD TO SPEED UP LTE CELL SELECTION/RESELECTION USING MULTIPLE RECEIVERS," the contents of which are incorporated by reference herein in their entirety for all purposes.

This application is related to concurrently filed U.S. patent application Ser. No. 14/498,888, entitled "METHOD AND APPARATUS FOR FAST RETURN TO AN LTE NETWORK FROM A LEGACY NETWORK UTILIZING MULTIPLE RECEIVERS", which is incorporated by reference herein in its entirety for all purposes.

FIELD

The described embodiments relate generally to wireless communications and more particularly to methods to accelerate LTE cell selection and reselection using multiple receivers of a mobile device.

BACKGROUND

As Long Term Evolution (LTE) wireless networks are being deployed to more places around the world, user equipment (UE) need to support an increasing number of LTE frequency division duplexing (FDD) frequency bands and time division duplexing (TDD) frequency bands. FDD operation uses a pair of frequency bands, one for communication in the uplink direction from the UE to a wireless network and one for communication in the downlink direction from the wireless network to the UE. TDD operation uses a single frequency band for communication in both the uplink and downlink directions. LTE wireless communication protocols specify different LTE frequency bands for FDD and TDD operation. The UE determines whether an FDD transmission or a TDD transmission can be made on a given frequency band. There are a large number of different frequency bands allocated for FDD LTE use, in which pairs of FDD LTE frequency bands can be associated together for simultaneous transmission in the uplink and downlink directions. Additionally, there are several different frequency bands allocated for TDD LTE use. With an increasing number of FDD and TDD LTE frequency bands available for use by a UE, there is a need to accelerate the LTE cell selection and reselection process.

Release 10 of the Third Generation Partnership Project (3GPP) LTE wireless communication protocol specification introduced carrier aggregation (CA) to provide for wider bandwidths for use by a UE. Carrier aggregation increases available bandwidth delivered to a UE by using multiple frequency bands with multiple carriers in parallel. Two or more component carriers (CCs) can be aggregated together to form a larger overall bandwidth for communication, e.g., up to 100 MHz of bandwidth by aggregating five different 20 MHz wide frequency bands. Carrier aggregation further allows for radio frequency spectrum deployment of component carriers that are contiguous or non-contiguous. Carrier aggregation of contiguous CCs within the same operating frequency band, as provided for LTE, is referred to as intra-band contiguous aggregation. Carrier aggregation of non-contiguous CCs that belong to the same frequency band with one or more gaps between the CCs is referred to as intra-band non-contiguous aggregation. Additionally, inter-band, non-contiguous carrier aggregation uses CCs that belong to different frequency bands. Each component carrier can support a frequency bandwidth of 1.4, 3, 5, 10, 15 or 20 MHz, which can vary for different component carriers. Component carriers are associated with a serving cell. In LTE Release 10, a maximum of five component carriers can be combined, and each component carrier can be associated with an independent receive signaling path in a UE.

Carrier aggregation can be used by a UE while in an LTE connected mode to communicate through multiple frequency bands in parallel to increase downlink (DL) and/or uplink (UL) data rates. Carrier aggregation is not used by the UE while in an LTE idle mode. LTE idle mode procedures can include actions such as cell measurement, cell search, cell selection, and cell reselection. Cell measurement includes measuring signal quality and signal strength of neighbor cells, while cell search includes locating a cell on which to camp. Cell selection includes determining a particular cell from a set of candidate cells, while cell reselection includes determining to switch from an existing cell to another cell. Each of these LTE idle mode procedures can be time consuming, which affects availability of a service for a user of the UE, and consumes limited battery power while being performed. Therefore, what is desired is a method to accelerate cell search and measurement by a mobile wireless device.

SUMMARY

Methods and apparatuses to accelerate searching for cells, such as during a cell selection and/or cell reselection procedure, by using multiple receivers of a wireless device in parallel are disclosed herein. Multiple receivers can be used by the wireless device to implement carrier aggregation, in an LTE connected mode, to communicate over multiple carriers simultaneously to aggregate multiple radio frequency bands, thereby increasing downlink and uplink data rates. The multiple receivers of the wireless device can also be used to perform concurrent, parallel searching for LTE cells, e.g., as part of a cell selection procedure and/or a cell reselection procedure. While in an LTE idle mode, a wireless device that includes at least two receivers can perform a concurrent, parallel search for LTE cells over multiple different radio frequency bands simultaneously. The wireless device can reduce a frequency scan time needed to generate a list of candidate frequencies for further cell acquisition as compared to using only one receiver to search for and to generate the list of candidate frequencies.

The wireless device can also process a voice call on a legacy wireless network using one receiver and perform a cell search on an LTE wireless network simultaneously using another receiver to accelerate returning to an LTE cell after a circuit-switched fall back (CSFB) procedure on the legacy wireless network ends. Multiple receivers of the wireless device can also be used for fast selection of an cell on which to camp after an "initial power up," e.g., when powering on the wireless device, or when returning from an out-of-service (OOS) condition. A wireless device that includes at least two receivers can use one receiver to search over a first set of cells and use another receiver to search over a second set of cells in parallel. Furthermore, the wireless device can use one receiver to perform a search on cells associated with a first radio access technology (RAT) and use another receiver to perform a search on cells associated with a second RAT. Thus, different receivers can perform searches for cells associated with different RATs concurrently.

This Summary is provided merely for purposes of summarizing some example embodiments, so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and claims.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Figure 1:
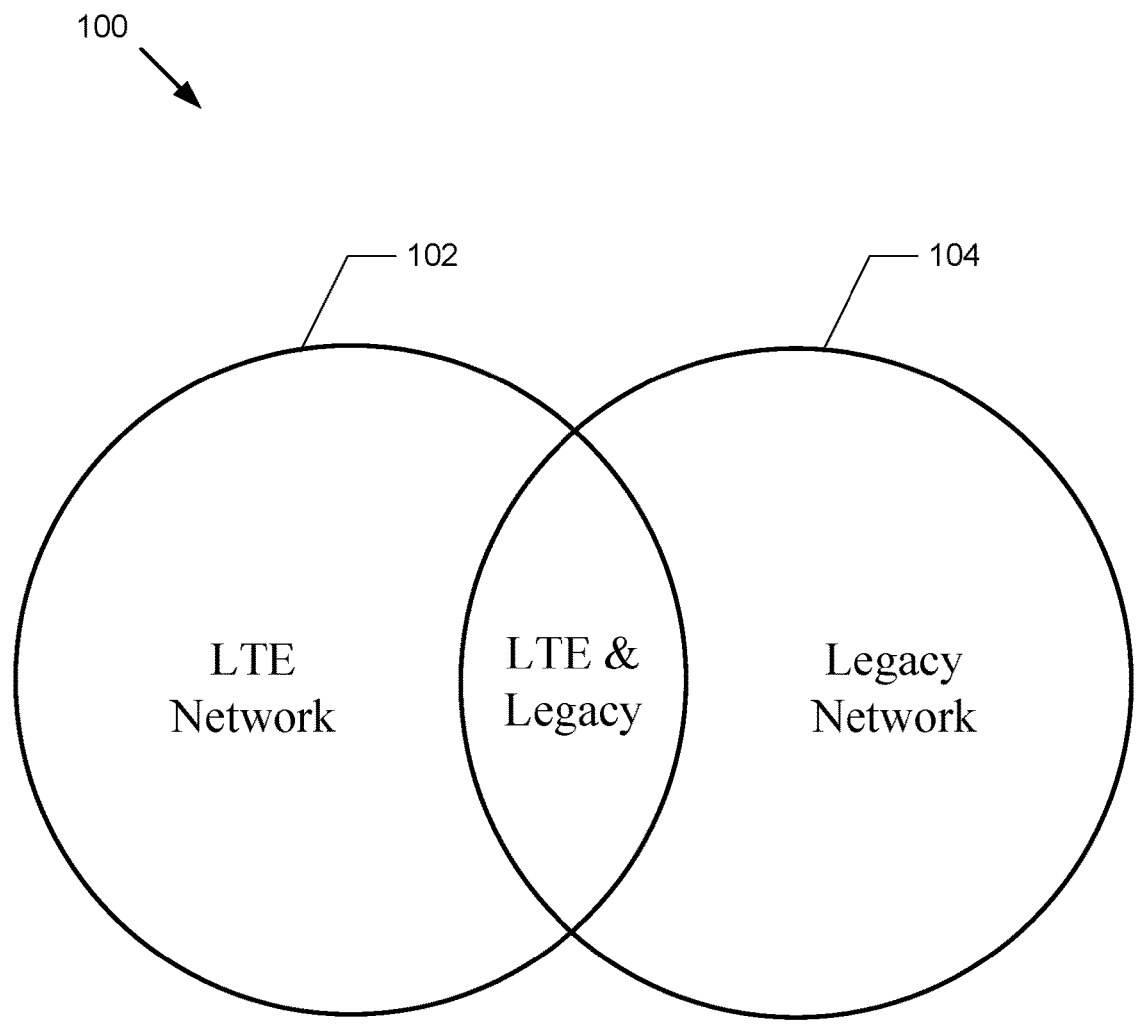
FIG. 1 illustrates overlapping coverage of an LTE network and a legacy network, in accordance with some embodiments.

Representative embodiments disclosed herein provide for methods and apparatuses to accelerate cell search, cell selection, and cell reselection using multiple receivers of a wireless device. Multiple receivers provided in a wireless device can be configured to implement carrier aggregation while in an LTE connected mode. Carrier aggregation can be used to aggregate multiple radio frequency bands to increase downlink and/or uplink data rates. While a UE is in an LTE idle mode, when carrier aggregation is not used, multiple receivers of the wireless device can be used for cell selection and reselection. The multiple receivers of the wireless device can be used to perform concurrent, parallel searches for cells during cell selection and/or reselection procedures thereby accelerating the search and selection of cells across multiple radio frequency bands and/or multiple radio access technologies.

In a first embodiment, a mobile device is provided. The mobile device can include wireless circuitry comprising at least a first receiver, a second receiver, and a transmitter. The mobile device further can include one or more processors in communication with the wireless circuitry and a storage medium for storing program code. The program code when executed can cause the mobile device to search concurrently a first set of cells associated with a first RAT using the first receiver, and on a second set of cells associated with a second RAT using the second receiver. The program code can further cause the mobile device to generate a list of candidate frequencies for cell acquisition and select a cell on which to camp using the list of candidate frequencies for cell acquisition. In some embodiments, the mobile device selects the cell on which to camp using the list of candidate frequencies and by obtaining at least one performance metric for each candidate frequency in the list of candidate frequencies. The mobile device selects the cell on which to camp based on a set of performance metrics obtained for the list of candidate frequencies. The performance metric includes a signal strength or a signal quality.

In a second embodiment, a method for fast LTE cell selection and reselection using at least two receivers in a wireless device is provided. The method can include concurrently searching a first set of LTE cells using a first receiver of the wireless device and on a second set of LTE cells using a second receiver of the wireless device, where the second set of LTE cells differs from the first set of LTE cells. The method can further include generating a list of candidate frequencies for cell acquisition; and selecting an LTE cell on which to camp using the list of candidate frequencies for cell acquisition. In one embodiment, the list of candidate frequencies can be generated by obtaining at least one performance metric for each candidate frequency in the list of candidate frequencies and selecting the LTE cell on which to camp based on a set of performance metrics associated with the list of candidate frequencies. The at least one performance metric includes a signal strength or a signal quality. The method can further include selecting the LTE cell using the candidate frequency in the list of candidate frequencies having a highest value for the signal strength or the signal quality. In some embodiment, when the wireless device includes a third receiver the method can further include concurrently searching a third set of cells associated with a non-LTE RAT using the third receiver. The non-LTE RAT can include wideband code division multiple access (WCDMA), CDMA2000 1x, universal mobile telecommunication system (UMTS), and global system for mobile communications (GSM).

In a third embodiment, a non-transitory machine-readable medium for storing instructions is provided. The instructions, when executed by one or more processors of a wireless device can cause the wireless device to determine a received signal code power (RSCP) of a present serving LTE cell. When the RSCP of the present serving cell falls below a first threshold and exceeds a second threshold, the instructions executed by the one or more processors can further cause the wireless device to perform a LTE inter-frequency cell detection and measurement procedure concurrently for a first set of LTE cells using a first receiver and for a second set of LTE cells using a second receiver, where the first set of LTE cells differs from the second set of LTE cells. Furthermore, the instructions, when executed by one or more processors can cause the wireless device to select a new serving LTE cell based on LTE inter-frequency cell detection and measurement data obtained for the first set of LTE cells and the second set of LTE cells. In some embodiments, when the RSCP of the present serving LTE cell falls below the second threshold, the instructions, when executed by one or more processors can further cause the wireless device to perform concurrently the LTE inter-frequency cell detection and measurement for a first set of LTE cells using a first receiver and an inter-RAT (iRAT) inter-frequency cell detection and measurement for a second set of cells using a second receiver. The instructions, when executed by one or more processors can further cause the wireless device to select a new serving LTE cell based on LTE inter-frequency cell detection and measurement data obtained for the first set of LTE cells and iRAT inter-frequency cell detection and measurement data obtained for the second set of cells.

In a fourth embodiment, an apparatus is provided for fast LTE selection and reselection using at least two receivers. The apparatus can include means for concurrently searching a first set of LTE cells using a first receiver of the wireless device and on a second set of LTE cells using a second receiver of the wireless device, where the second set of LTE cells differs from the first set of LTE cells. The apparatus can further include means for generating a list of candidate frequencies for cell acquisition; and means for selecting an LTE cell on which to camp using the list of candidate frequencies for cell acquisition.

In a fifth embodiment, a method for returning of a mobile wireless device to a LTE network from a legacy network is provided. The method can include switching from the LTE network to the legacy network in accordance with a circuit-switched fall back (CSFB) procedure in order to process a voice call and establishing a connection on the legacy network using a first receiver and a transmitter of the mobile wireless device for processing the voice call. The method can further include determining, during the voice call, a strongest suitable LTE cell of the LTE network using a second receiver of the mobile wireless device based on one or more measured performance metrics. The one or more measured performance metrics include signal strength and signal quality metrics. The signal strength metrics comprises a received signal strength indicator (RSSI), a received signal code power (RSCP), and a reference signal received power (RSRP). The signal quality metrics comprises a signal to interference plus noise ratio (SINR) and a reference signal received quality (RSRQ). The method can further include returning to the LTE network by camping on the strongest suitable LTE cell found during the voice call.

In a sixth embodiment, a mobile station for returning to a LTE network from a CSFB procedure is provided. The mobile station can include a wireless circuitry comprising a first receiver, a second receiver, and a transmitter. The mobile station can further include a wireless processor coupled to the wireless circuitry and a storing medium for storing program code. Execution of the program by the wireless processor can cause the mobile station to switch from the LTE network to a legacy network in accordance with the CSFB procedure in order to process a voice call. Execution of the program by the wireless processor can further cause the mobile station to establish a connection on the legacy network using the first receiver and the transmitter for processing the voice call; determine, during the voice call, a strongest suitable LTE cell of the LTE network using a second receiver of the mobile station based on one or more measured performance metrics; and return to the LTE network by camping on the strongest suitable LTE cell found during the voice call, after releasing the voice call. In one embodiment, the wireless circuitry can include a third receiver. The mobile station can use the third receiver to search concurrently for the strongest suitable LTE cell of the LTE network during the voice call. In another embodiment, when no suitable LTE cell is found during the voice call, after releasing the voice call, execution of the program code by the wireless processor can further cause the mobile station to search concurrently, for a predefined period of time, on a set of legacy network cells using the first receiver to find a strongest suitable LTE cell; search concurrently, a first set of LTE network cells using the second receiver and a second set of LTE network cells using the third receiver to find the strongest suitable LTE cell; and return to the LTE network by camping on the strongest suitable LTE cell found during the predefined period of time. In yet another embodiment, when no suitable LTE cell is found during the predefined period of time, execution of the program code by the wireless processor can further cause the mobile station to camp on the strongest suitable legacy cell found during the predefined period of time and continue to search for the strongest suitable LTE cell using the second and third receivers.

In a seventh embodiment, a non-transitory machine-readable medium for storing instructions is provided. The instructions, when executed by one or more processors contained in a UE can cause the UE to switch from the LTE network to the legacy network in accordance with a circuit-switched fall back (CSFB) procedure in order to process a voice call and establish a connection on the legacy network using a first receiver and a transmitter for processing the voice call. The instructions, when executed by one or more processors contained in a UE can further cause the UE to determine, during the voice call, a strongest suitable LTE cell of the LTE network using a second receiver of the UE based on one or more measured performance metrics and return to the LTE network by camping on the strongest suitable LTE cell found during the voice call, after releasing the voice call. The one or more measured performance metrics include signal strength and signal quality metrics. The signal strength metrics comprises a received signal strength indicator (RSSI), a received signal code power (RSCP), and a reference signal received power (RSRP). The signal quality metrics comprises a signal to interference plus noise ratio (SINR) and a reference signal received quality (RSRQ). After releasing the voice call, further execution of the instruction by one or more processors, when no suitable LTE cell is found during the voice call, can cause the UE to search concurrently for a predefined period of time on a set of legacy network cells to find a strongest suitable legacy cell using the first receiver and on a set of LTE network cells to find the strongest suitable LTE cell using the second receiver; and return to the LTE network by camping on the strongest suitable LTE cell found during the predefined period of time.

Some embodiments disclosed herein further provide for a method for fast selection of a cell to camp on after a circuit-switched fallback (CSFB) voice call on a legacy system is released. Here, multiple receivers, which can be used for implementing carrier aggregation, are utilized to tune to different carrier frequencies, so that the UE can camp on a legacy network cell using a first receiver, while a second receiver continues to perform a cell search for suitable LTE cells. Some embodiments disclosed herein also provide for a method for fast LTE and iRAT (inter-RAT, where RAT stands for Radio Access Technology) inter-frequency cell detection and measurement. Here, multiple receivers, which can be used for implementing carrier aggregation, are utilized to tune to different carrier frequencies for concurrent parallel processing of the cell detection and measurement, so that the cell detection and measurement processing time is effectively reduced.

An LTE network is a data packet only network (NW). To support a voice call that does not use VoLTE (Voice over LTE), the LTE specification defines a CSFB mode in which a UE switches from an LTE mode to a legacy mode to originate/receive a MO/MT (mobile originated/mobile terminated) voice call and then switches back to LTE when the voice call is released. As an example, a legacy mode can include communication in accordance with a UMTS/CDMA/GSM (Universal mobile telecommunications system/Code division multiple access/Global system for mobile communications) wireless communication protocol. Switching back to LTE is defined to follow a normal legacy network (e.g., UMTS/CDMA/GSM) call release procedure (e.g., cell search after connection release). In this procedure, LTE is searched first. If a suitable LTE cell is found, then the UE camps on the suitable LTE cell. Otherwise, UE camps on a legacy network (e.g., UMTS/CDMA/GSM) cell, and will reselect to an LTE cell if an LTE cell is found later using cell re-selection procedure.

In general, cell selection after a voice call release should be as fast as possible, so that the UE can re-camp on a serving cell and start to listen to paging. Otherwise, a next paging message can be missed. Fast re-camp can occur, if the UE selects a cell using the same RAT (Radio Access Technology) as the just released voice call. This can most likely be the active cell which the voice call was on, or one of the stronger neighboring cells on the same RAT. With CSFB, after the voice call is released, the UE needs to search the LTE network first, and then the legacy network (e.g., UMTS/CDMA/GSM) which the voice call was on. This procedure can increase the re-camp time dramatically if the legacy network (NW) does not provide LTE cell information (or provides insufficient LTE cell information) in the RRC (Radio Resource Control) connection release message which is triggered by the voice call release. Unfortunately, most current network deployments do not provide LTE cell information, as UMTS/CDMA/GSM are established networks.

A long re-camp time after CSFB voice call release can result in a poor user experience, as a user can expect to resume LTE service instantly after a voice call is released. Therefore, what is desired is a method of fast return to LTE from CSFB.

Some embodiments disclosed herein provide for assisting return to a first network from a second network after performance of a CSFB procedure. In some embodiments, the first network can be an LTE network, while the second network can be a legacy network such as UMTS/CDMA/GSM. In this regard, a wireless communication device in accordance with some example embodiments can be configured with two receivers so that the first receiver is used to process the voice call using CSFB on the legacy network, while the second receiver is used to determine a strongest suitable LTE cell available while the voice call is still active. Since such a wireless communication device can always know the strongest suitable LTE cell available, this allows for fast return to LTE after the voice call has ended and CSFB has released the voice call from the legacy network. In general, a wireless communication device that is configured with two or more receivers can perform a fast return to the first network from the second network after performance of a CSFB procedure, because one of the two or more receivers can be used for servicing the CSFB call while another one of the two or more receivers can be used to determine the strongest suitable cell available on the first network. Accordingly, such a faster return to a network following performance of a CSFB procedure provides for a better user experience for data services due to a quicker return to a network offering faster data rates. It also provides for a better overall user experience, because the user can have an expectation of an instant return to the first network after performance of a CSFB procedure.

In accordance with various embodiments described herein, the terms "wireless communication device," "wireless device," "mobile device," "mobile station," and "user equipment" (UE) may be used interchangeably herein to describe one or more common consumer electronic devices that may be capable of performing procedures associated with various embodiments of the disclosure. In accordance with various implementations, any one of these consumer electronic devices may relate to: a cellular phone or a smart phone, a tablet computer, a laptop computer, a notebook computer, a personal computer, a netbook computer, a media player device, an electronic book device, a MiFi® device, a wearable computing device, as well as any other type of electronic computing device having wireless communication capability that can include communication via one or more wireless communication protocols such as used for communication on: a wireless wide area network (WWAN), a wireless metro area network (WMAN) a wireless local area network (WLAN), a wireless personal area network (WPAN), a near field communication (NFC), a cellular wireless network, a fourth generation (4G) LTE, LTE Advanced (LTE-A), and/or 5G or other present or future developed advanced cellular wireless networks. The wireless communication device, in some embodiments, can also operate as part of a wireless communication system, which can include a set of client devices, which can also be referred to as stations, client wireless devices, or client wireless communication devices, interconnected to an access point (AP), e.g., as part of a WLAN, and/or to each other, e.g., as part of a WPAN and/or an "ad hoc" wireless network. In some embodiments, the client device can be any wireless communication device that is capable of communicating via a WLAN technology, e.g., in accordance with a wireless local area network communication protocol. In some embodiments, the WLAN technology can include a Wi-Fi (or more generically a WLAN) wireless communication subsystem or radio, the Wi-Fi radio can implement an Institute of Electrical and Electronics Engineers (IEEE) 802.11 technology, such as one or more of: IEEE 802.11a; IEEE 802.11b; IEEE 802.11g; IEEE 802.11-2007; IEEE 802.11n; IEEE 802.11-2012; IEEE 802.11ac; or other present or future developed IEEE 802.11 technologies.

FIG. 1 illustrates overlapping coverage of an LTE network 102 and a legacy network 104 in a communications system 100 in accordance with some example embodiments. The LTE network 102 can, for example, be a fourth generation (4G) network based on an LTE wireless communication protocol, such as an LTE network or an LTE-Advanced (LTE-A) network, or other network that can offer faster data rates than legacy networks, such as second generation (2G) and third generation (3G) networks, but may not support circuit-switched voice calls. It will be appreciated that the LTE network is illustrated by way of example, and not by way of limitation. In this regard, other wireless networks in existence now or that may be developed in the future that offer higher data rates but that do not support circuit-switched (CS) voice calls can be substituted for the LTE network 102 within the scope of the disclosure. The legacy network 104 can be any legacy wireless network having a CS domain to support CS voice calls. By way of non-limiting example, the legacy wireless network 104 can be a 3G network, such as a wideband code division multiple access (WCDMA) or other universal mobile telecommunications system (UMTS) network, such as a time division synchronous code division multiple access (TD-SCDMA) network. As a further example, the legacy network 104 can be a CDMA2000 network, such as a 1xRTT network, or other network standardized by the Third Generation Partnership Project 2 (3GPP2) that supports a CS domain. As another example, the legacy network can be a 2G network such as a global system for mobile communications (GSM) network.

The LTE network 102 and legacy network 104 can each have regions of coverage represented by the respective circles illustrated in FIG. 1. The regions of coverage can overlap, such as illustrated by the overlapping portions of the circles in FIG. 1. A wireless communication device in accordance with some example embodiments can operate on both the LTE network 102 and the legacy network 104. Thus, for example, when the wireless communication device is in a region of overlapping coverage, the wireless communication device can be connected to the LTE network 102 with an ongoing data session and can perform a CSFB procedure to the legacy network 104 in response to initiation of a circuit-switched voice call.

Figure 2:
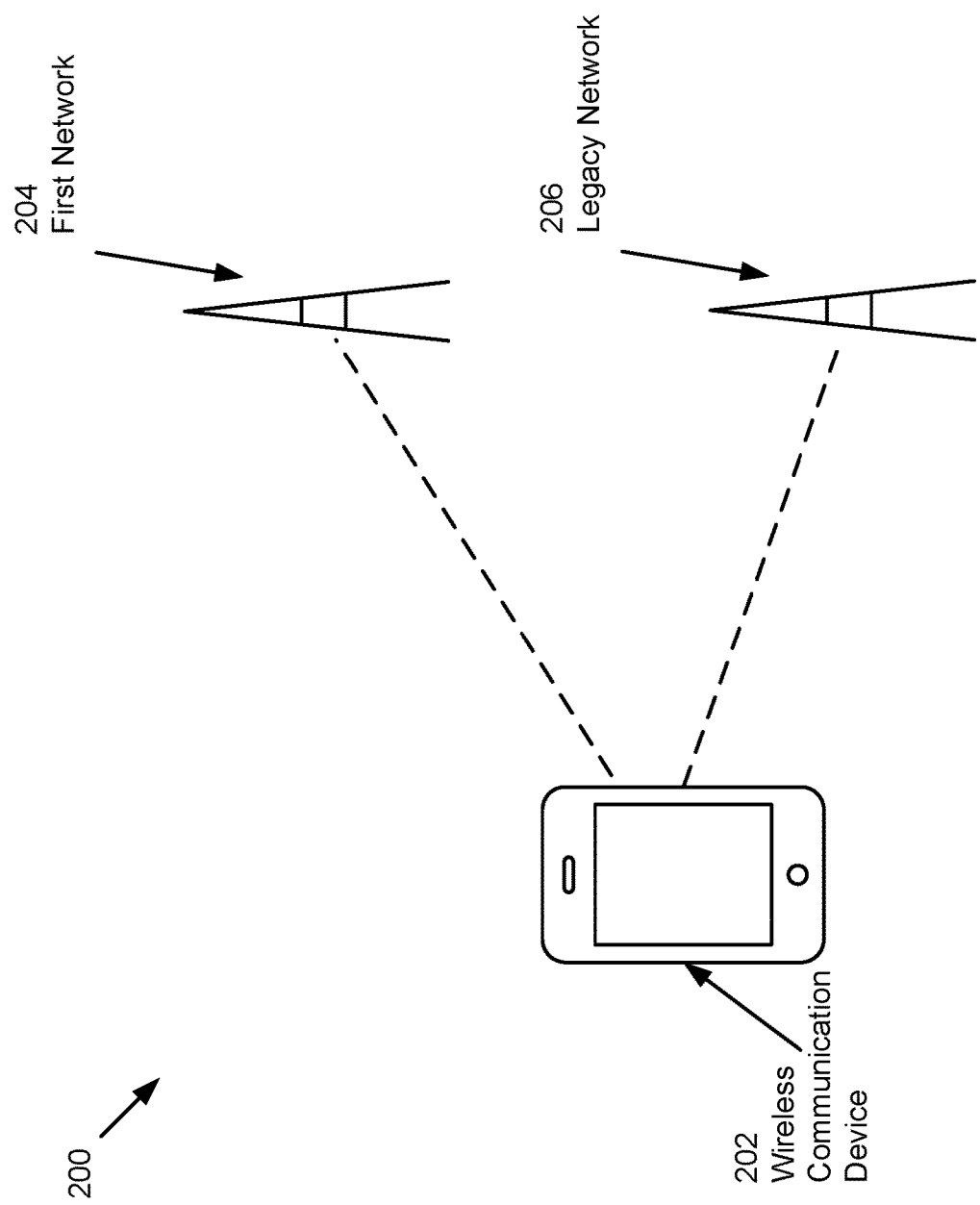
FIG. 2 illustrates an example system having multiple wireless communication networks to which a wireless communication device can connect, in accordance with some embodiments.

FIG. 2 illustrates an example system 200 having multiple wireless communication networks to which a wireless communication device 202 can connect in accordance with some example embodiments. By way of non-limiting example, the wireless communication device 202 can be a cellular phone, such as a smart phone device; a tablet computing device; a laptop computing device; or other computing device configured to operate within both a first network 204 and a legacy network 206. The first network 204 can be any network supporting packet switched (PS) data sessions and offering higher theoretical data rates than the legacy network 206, but that does not support CS voice calls. Thus, for example, the first network 204 can be a network using an LTE standard (e.g., an LTE network, LTE-A network, or using another present or future developed LTE standard), such as the LTE network 102 illustrated in FIG. 1. The legacy network 206 can be any network having a CS domain to support CS voice calls. By way of non-limiting example, the legacy network 206 can be a UMTS network, a 3GPP2 CDMA2000 1x network, or other 3G network. As a further example, the legacy network 206 can be a GSM or other 2G network, or other legacy network that can support CS voice calls. In this regard, the legacy network 206 can be the legacy network 104.

As illustrated in FIG. 2, the wireless communication device 202 can be within signaling range of both a base station or other access point for the first network 204 and a base station or other access point for the legacy network 206. In this regard, the wireless communication device 202 can be located in a region of overlapping coverage of the first network 204 and the legacy network 206. As such, the wireless communication device 202 can connect to the first network 204. In response to initiation of a CS voice call (e.g., a mobile originating voice call initiated by the wireless communication device 202 or a mobile terminating voice call placed to the wireless communication device 202), the wireless communication device 202 can participate in a CSFB procedure to the legacy network 206 so that the voice call can be supported. The CSFB procedure can, for example, be performed as defined in Technical Specification (TS) 23.272, the contents of which are disclosed herein by reference in its entirety. In some instances, the wireless communication device 202 can establish a data session over the first network 204 prior to performance of the CSFB procedure, and the data session can be moved to the legacy network 206 as a result of the CSFB procedure. Additionally or alternatively, in some instances, a data session can be established over the legacy network 206 subsequent to performance of the CSFB procedure. As the legacy network 206 can offer lower data rates than the first network 204, a data session moved to or established on the legacy network 206 as a result of a CSFB procedure can be impacted by lower data rates than would be supported if the data session were serviced by the first network 204 that can support higher data rates, e.g. an LTE NW.

Figure 3:
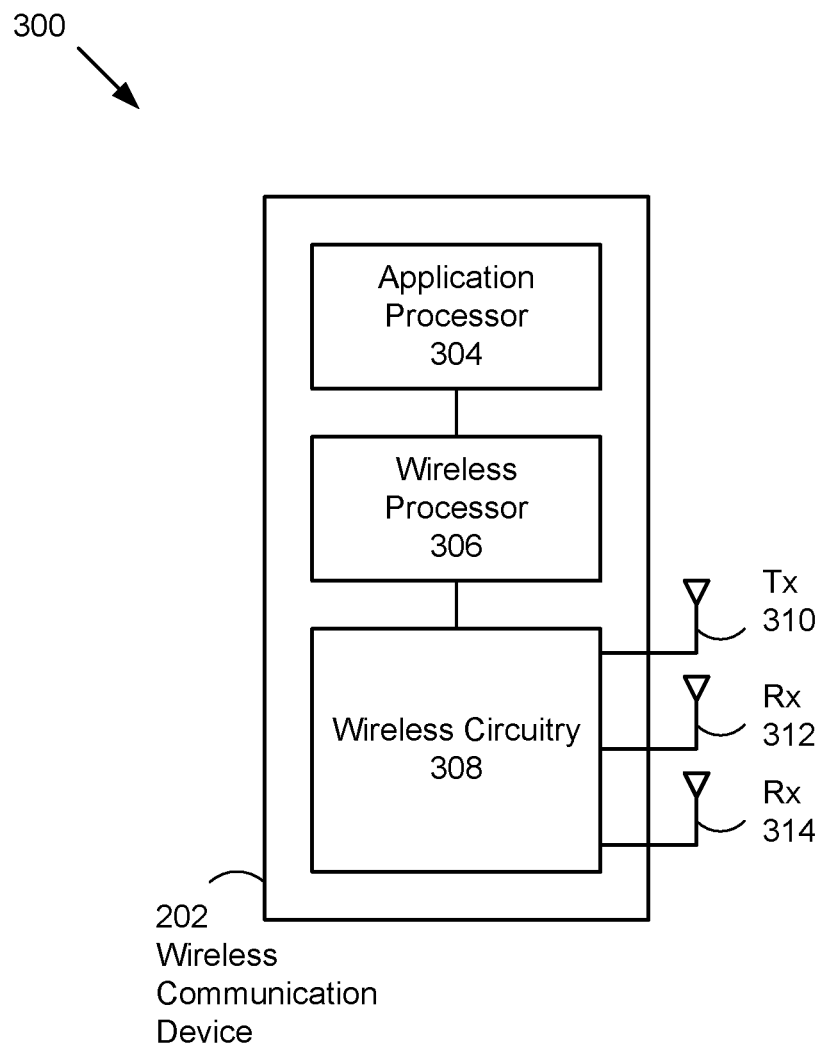
FIG. 3 illustrates select components of a wireless communication device with multiple receivers, in accordance with some embodiments.

FIG. 3 illustrates select components 300 of the wireless communication device 202 that can be used for processing radio frequency signals for transmission and reception by the wireless communication device 202. In particular, FIG. 3 illustrates select components 300 of the wireless communication device 202 that can be used to support carrier aggregation, such as LTE Release 10 carrier aggregation. The wireless communication device 202 can be used to support carrier aggregation, because it has at least two receivers 312 and 314.

LTE Release 10 introduced carrier aggregation (CA) to increase bandwidth per UE. Each aggregated radio frequency carrier, as a component carrier (CC), can have a bandwidth of 1.4, 3, 5, 10, 15 or 20 MHz. A maximum of five CCs can be aggregated. Each CC can be associated with an independent radio frequency (RF) receiver (RX) path having its own local oscillator(LO), which can be tuned to a different frequency from the frequency used for a serving CC associated with a primary serving cell. Each component carrier can be associated with a cell for an eNodeB. For minimum support of CA, a UE needs to support at least two CCs. As such, FIG. 3 shows a wireless communication device 202 with two receivers 312 and 314 that can support CA. CA is used only in an LTE connected mode for aggregating multiple bandwidths to increase DL/UL data rates. CA is not used in an LTE idle mode when cell selection/reselection takes place.

In FIG. 3, the wireless communication device 202 can include one or more processors and wireless circuitry that can cooperate together in establishing connections, interacting with application programs, formatting data in accordance with one or more wireless communication protocols, translating digital data into radio frequency signals suitable for transmission, and similarly converting received radio frequency signals into digital data. The wireless communication device 202 can include an application processor 304 that can request establishment of wireless connections to support communication for various applications running thereon. The wireless communication device 202 can also include a wireless processor 306 that can control the establishment and release of wireless connections to provide connectivity and communication for the wireless communication device 202 at least in part in response to request from the application processor 304. The wireless processor 306 can also provide for suitable formatting and in some embodiments modulation of data for transmission and demodulation of data for reception of radio frequency signals through wireless circuitry 308 included in the wireless communication device 202. The wireless circuitry 308 can be connected to one or more radio frequency transmit signal chains (including internal and/or external circuitry, e.g., antennas) 310 and two or more radio frequency receive signal chains (including internal and/or external circuitry, e.g., antennas) 312 and 314. In particular, the wireless circuitry 308 includes multiple radio frequency receive signal chains that can provide for carrier aggregation of radio frequency signals using multiple carriers simultaneously for communication between the wireless communication device 202 and multiple cells (radio sectors) connected to a common eNodeB (e.g., an evolved Node B, also referred to as an eNB). The wireless communication device 202 can configure the wireless processor 306 and wireless circuitry 308/310/312/314 to receive radio frequency signals from one or more radio sectors (cells) individually in series and/or collectively in parallel. In some embodiments, the wireless processor 306 can configure wireless circuitry 308/310/312/314 to receive radio frequency signals on a first set of frequencies from a set of serving cells and can re-configure the wireless circuitry 308/310/312/314 to receive radio frequency signals on a second set of frequencies from a set of inter-frequency neighbor cells and/or inter-RAT neighbor cells, e.g., during measurement gap time periods specified by the eNodeB to which the wireless communication device 202 can be connected through the serving cells during normal communication.

The wireless communication device 202 can include wireless circuitry that supports different wireless communication protocols and/or radio access technologies. In some embodiments, the wireless communication device 202 can include separate wireless circuitry for different wireless communication protocols and/or radio access technologies. In some embodiments, the wireless communication device 202 can include a combined, integrated block of wireless circuitry that can support a combination of different wireless communication protocols and/or different radio access technologies. The wireless circuitry 308 can include transmitters and receivers to provide signal processing of radio frequency wireless signals formatted according to one or more wireless communication protocols, e.g., GSM, UMTS, CDMA2000, LTE, and/or LTE-Advanced wireless communication protocols. In some embodiments, the wireless circuitry 308 can include components such as: processors and/or specific-purpose digital signal processing (DSP) circuitry for implementing functionality such as, but not limited to, baseband signal processing, physical layer processing, data link layer processing, and/or other functionality; one or more digital to analog converters (DACs) for converting digital data to analog signals; one or more analog to digital converters (ADCs) for converting analog signals to digital data; radio frequency (RF) circuitry (e.g., one or more amplifiers, mixers, filters, phase lock loops (PLLs), and/or oscillators); and/or other components.

Figure 4:
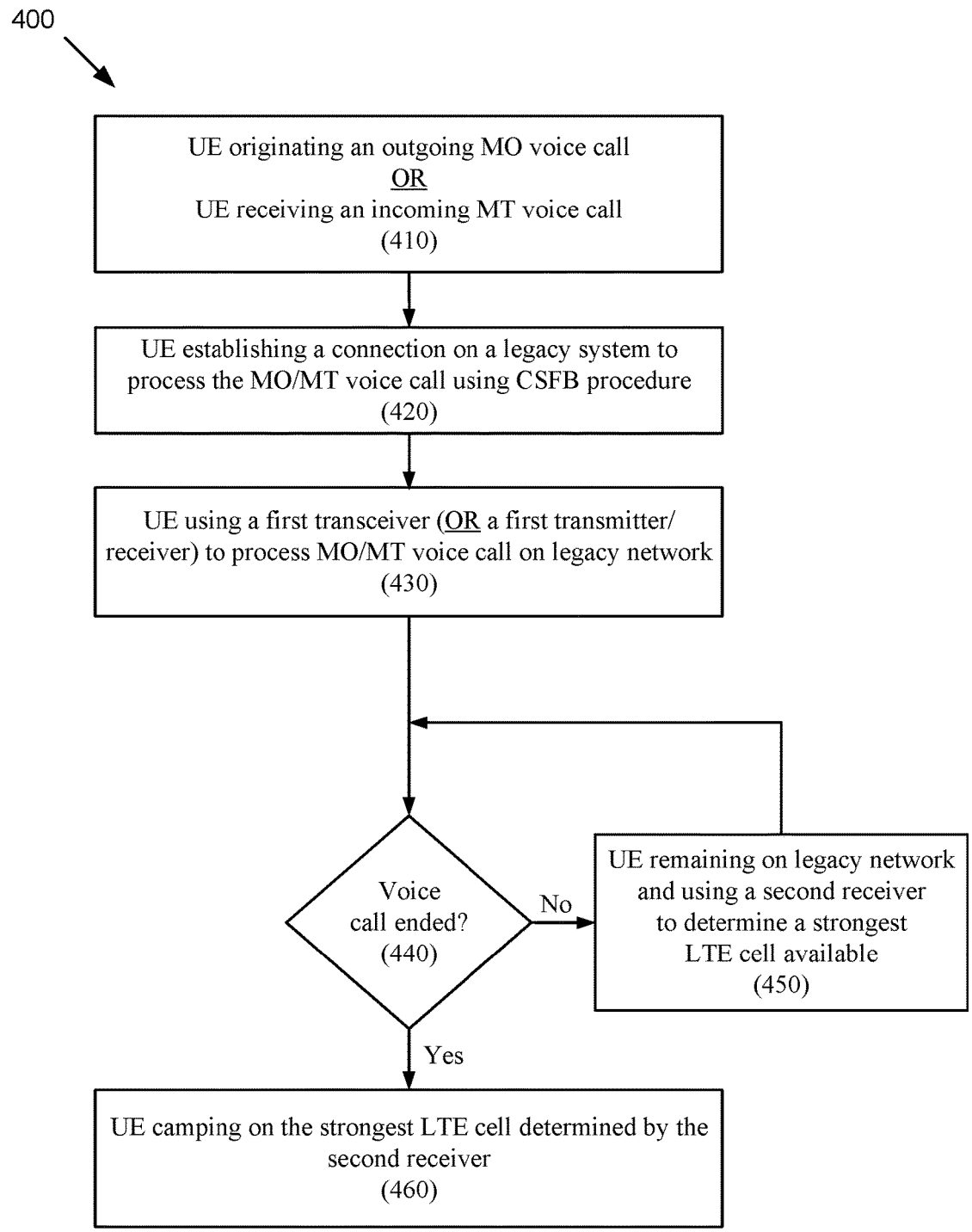
FIG. 4 illustrates a flowchart of a representative method for fast return to LTE from a CSFB procedure using multiple receivers of a wireless device, in accordance with some embodiments.

FIG. 4 illustrates a representative method 400 for fast return to LTE from CSFB utilizing multiple receivers in accordance with some embodiments. In a first step 410, a UE, such as the wireless communication device 202, can either originate a mobile originated (MO) call, or receive a paging indication on LTE NW (network) about an incoming voice mobile terminated (MT) call. Following a normal CSFB procedure, the UE switches to a legacy network, such as a UMTS/CDMA network, using its transmitter (TX) path to setup the MO/MT call. This is shown in step 420, where the UE (e.g., the wireless communication device 202) establishes a connection on a legacy network to process the MO/MT voice call using CSFB procedure. In step 430, the UE uses a first transceiver (or a first transmitter and a first receiver) to process MO/MT voice call on a legacy network. In some embodiments, the first transmitter 310 and the first receiver 312 of the wireless communication device 202 can be used to process MO/MT voice call on the legacy network. In step 440, the UE checks if the voice call has ended. If the voice call has not ended, the method proceeds to step 450, where the UE remains on the legacy network, using a second receiver to determine a strongest suitable LTE cell available. In some embodiments, the UE can use the second receiver to continually determine a strongest suitable LTE cell available for use by UE. The strongest suitable LTE cell can be determined based on one or more signal strength metrics and/or signal quality metrics obtained for LTE cells found by the UE. In some other embodiments, the UE can use the second receiver to determine once the strongest suitable LTE cell available for use by the UE. An LTE cell can generally be determined to be "strongest suitable" based on a combination of signal strength and/or signal quality, both of which can be network and RAT dependent. In some embodiments, suitability of a cell can be determined based on a comparison of one or more performance metrics (e.g., signal strength and/or signal quality) to one or more thresholds. A "suitable" cell can satisfy a set of performance metrics, while a "strongest suitable" cell can be the "strongest" cell of a set of "suitable" cells that satisfy the set of performance metrics. Representative signal strength metrics include received signal strength indicator RSSI, received signal code power (RSCP), and reference signal received power (RSRP). Representative signal quality metrics include signal to interference plus noise ratio(SINR), reference signal received quality (RSRQ), and other signal to noise metrics. In some embodiments, the second receiver 314 of the wireless communication device 202 can be used to determine a strongest suitable LTE cell available. In some embodiments, the UE uses the second receiver to determine a strongest suitable LTE cell available by utilizing the following steps: (1) monitor an LTE serving cell and search/measure neighboring cells in long DRX mode, and (2) reselect to a stronger LTE cell using an LTE re-selection procedure. In some embodiments, the standard selection/reselection criteria can be used for ranking the cells for selecting the best cell. When the voice call ends, the method proceeds to step 460, where the UE camps on the strongest suitable LTE cell available as determined by using the second receiver. In some embodiments, the UE camps on the strongest suitable LTE cell available as determined by using the second receiver by utilizing the following steps: (1) CS voice call is released on legacy network, and (2) UE switches both its transmitter (TX) path and receiver (RX) path on the legacy network back to an LTE cell being monitored by the second receiver, which should be the strongest suitable LTE cell available.

By implementing a method for fast return to LTE from CSFB utilizing multiple receivers, such as method 400 shown in FIG. 4, the improvement in re-camp time to LTE after CSFB voice call release can be quite dramatic. The re-camp time can possibly drop from 20 seconds (without implementation of method 400) to less than one second (with implementation of method 400). This is because, without implementation of method 400, searching for the strongest suitable LTE cell can take as long as twenty seconds. But, with implementation of method 400, the strongest suitable LTE cell is already available when the CSFB voice call is released, so the re-camp on the strongest suitable LTE cell can take less than one second. Power consumption attributed to the second receiver continually monitoring for a strongest suitable LTE cell available is small as compared to the power consumption for the concurrent voice call. Since the power drain on a voice call can be significant, the power consumption overhead for implementing method 400 can be almost negligible. Finally, when a wireless communication device is configured with more than two receivers, the third, fourth, and more receivers can be used together with the second receiver for determining a strongest suitable LTE cell available in parallel. By concurrently monitoring cells in parallel, the multiple receivers can accelerate the LTE search process significantly. In some embodiments, the third, fourth, and more receivers can also be used to monitor for more than one (Radio Access Technologies (RATs).

Figure 5:
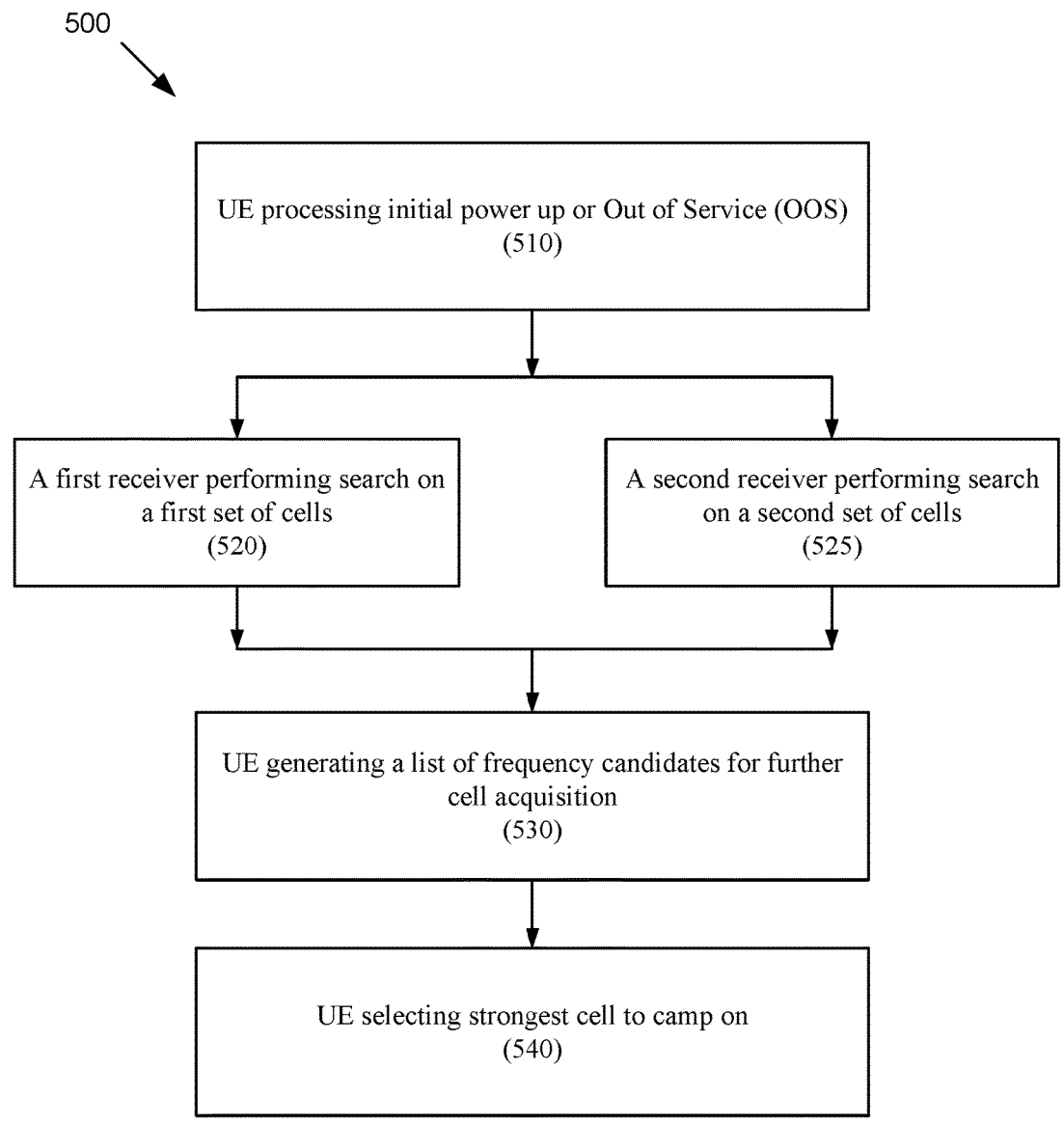
FIG. 5 illustrates a flowchart of a representative method for fast selection of a cell after an "initial power up" or when returning from an "out-of-service" condition, in accordance with some embodiments.

FIG. 5 illustrates a representative method 500 for fast selection of an LTE cell to camp on after "initial power up" or returning from an "Out of Service" (OOS) in accordance with some embodiments. During "initial power up" or returning from "Out of Service", to search for a strongest suitable cell on which to camp, all supported radio frequency bands need to be scanned to find a list of radio frequencies having a minimum 1.4 MHz bandwidth and a strong enough signal to support LTE communication. With LTE Release 10 carrier aggregation, each component carrier can tune to a different radio frequency with the same RF band or located in different RF bands at same time. For example, if two CCs are implemented, two RF sample streams, each from a different radio frequency, can be captured at same time. The same frequency scan algorithm usually used on one RF sample stream can be utilized on two RF sample streams at same time, effectively reducing frequency scan time by 50% to generate the same list of frequency candidates for cell acquisition.

For FIG. 5, in a first step 510, a UE, such as the wireless communication device 202, can process an "initial power up" or an "Out of Service" (OOS). In step 520, a first receiver of the UE can perform a search on a first set of cells. At the same time, in the step 525, a second receiver of the UE can perform a search on a second set of cells. The first receiver and the second receiver can search for cells using different radio frequencies, so that the cells belonging to the first and second sets can be different. In some embodiments, the first receiver 312 of the wireless communication device 202 can be used to search a first set of cells, while the second receiver 314 of the wireless communication device 202 can be used to search a second set of cells in parallel. In step 530, the UE can generate a list of frequency candidates for further cell acquisition. As the first receiver and the second receiver search for cells using different frequencies at the same time, the frequency scan time needed to generate a same list of frequency candidates for further cell acquisition is effectively reduced by a factor of ½, as compared to the case where only one receiver is used for searching. With LTE Release 10 carrier aggregation, up to five component carriers (CCs) can be aggregated, and a UE, such as the wireless communication device 202, can be configured to include as many as five receivers. In general, if N receivers are used to search for cells concurrently, the frequency scan time can be effectively reduced by a factor of 1/N. Finally, in step 540, the UE can select a strongest suitable cell to camp on, using the list of frequency candidates for further cell acquisition generated in previous step 530. The "strongest suitable" cell can be determined using representative signal strength and quality metrics previously described.

Figure 6:
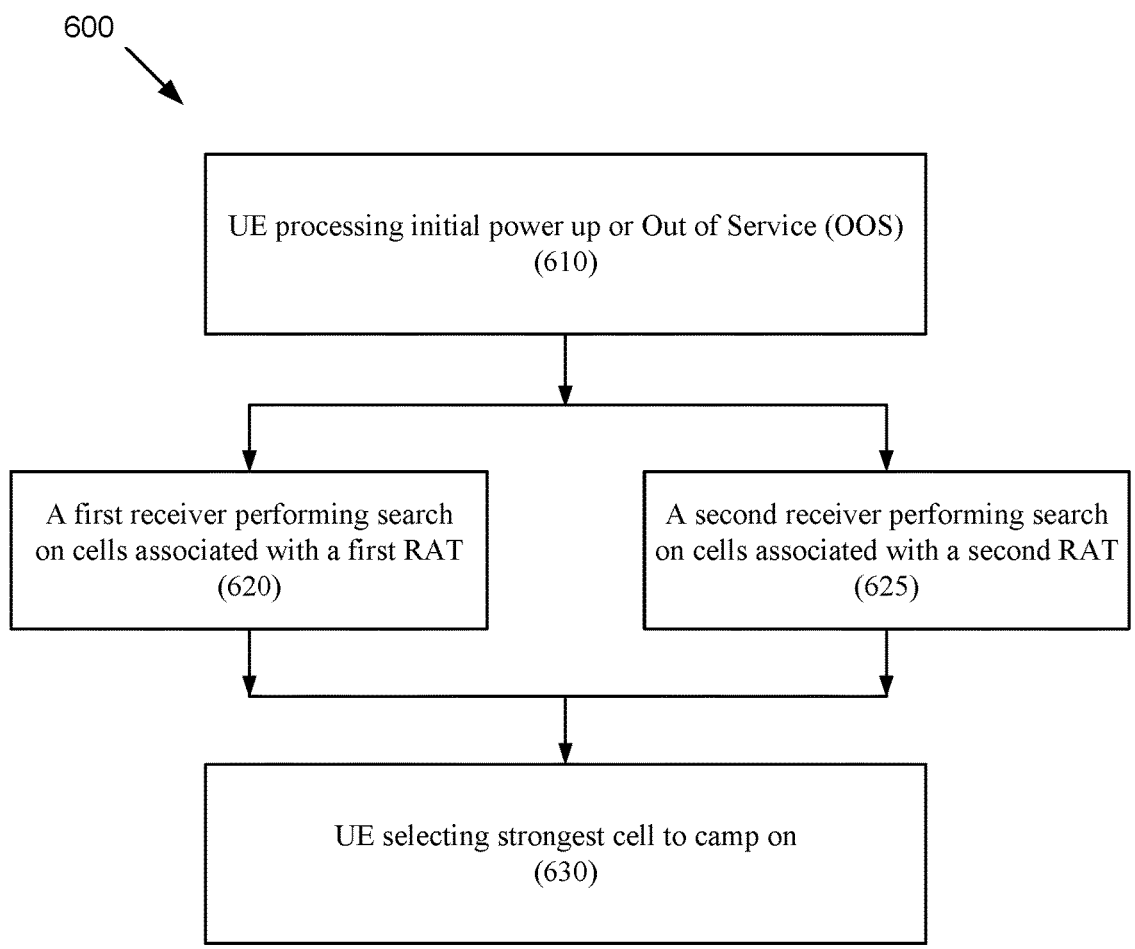
FIG. 6 illustrates a flowchart of a representative method for fast selection of a cell, from among several different radio access technologies, after an "initial power up" or when returning from an "out-of-service" condition, in accordance with some embodiments.

FIG. 6 illustrates a representative method 600 for fast selection of a cell (from among several different Radio Access Technologies) to camp on after "initial power up" or returning from an "Out of Service" (OOS) in accordance with some embodiments. In "initial power up" or "Out of Service" (OOS), the UE searches LTE, UMTS, GSM, CDMA2000 1X, and CDMA2000 EV-DO sequentially based on a RAT priority list defined by PLMN (public land mobile network). For example: LTE can be set to a highest priority, and UMTS can be set to a second priority. If an LTE search utilizing one receiver does not find any suitable LTE cell, the UE can utilize multiple receivers to tune to different RAT (e.g., UMTS, GSM, CDMA2000 1x, or CDMA2000 EV-DO) bands/frequencies at the same time to accelerate the frequency scan for a strongest suitable cell across multiple RATs. The UE can split multiple receivers on different RATs. For example, with two receivers, the first receiver can tune to the LTE band, while the second receiver can tune to a UMTS band. This parallel search can be especially useful for scenarios where the high priority RAT is "Out of Service", but the lower priority RAT has suitable cell available. Additionally, while the UE is following a procedure to connect and/or operate on cells with a lower priority RAT, the UE can simultaneously look for cells with a higher priority RAT and switch to the higher priority RAT immediately if a strongest suitable cell should be located.

For FIG. 6, in a first step 610, a UE, such as the wireless communication device 202, can process an "initial power up" or an "Out of Service" (OOS). In step 620, a first receiver of the UE can perform a search on cells associated with a first RAT. At the same time, in the step 625, a second receiver of the UE can perform a search on cells associated with a second RAT. The first receiver and the second receiver can search for cells that use different RATs, so that a strongest suitable cell can be quickly found in the scenario where a high priority RAT is "Out of Service" (OOS). In some embodiments, the first receiver 312 of the wireless communication device 202 can be used to search cells associated with a first RAT, while the second receiver 314 of the wireless communication device 202 can be used to search cells associated with a second RAT. In step 630, the UE can select the strongest suitable cell to camp on. As with LTE Release 10 carrier aggregation, where up to five component carriers (CCs) can be aggregated, a UE, such as the wireless communication device 202, can be configured to include as many as five receivers. In some embodiments, each receiver can be used to search for cells associated with a different RAT. In some embodiments, two or more receivers can be used to search for cells associated with the same RAT, which can accelerate the frequency scan for that particular RAT. An optimal configuration of the parallel receivers can depend on the priorities of RAT, with more receivers dedicated to a higher priority RAT. Among RATs with the same priority, an optimal configuration of the parallel receivers can depend on the number of cells associated with each RAT, with more receivers dedicated to a RAT with a larger number of cells.

Figure 7:
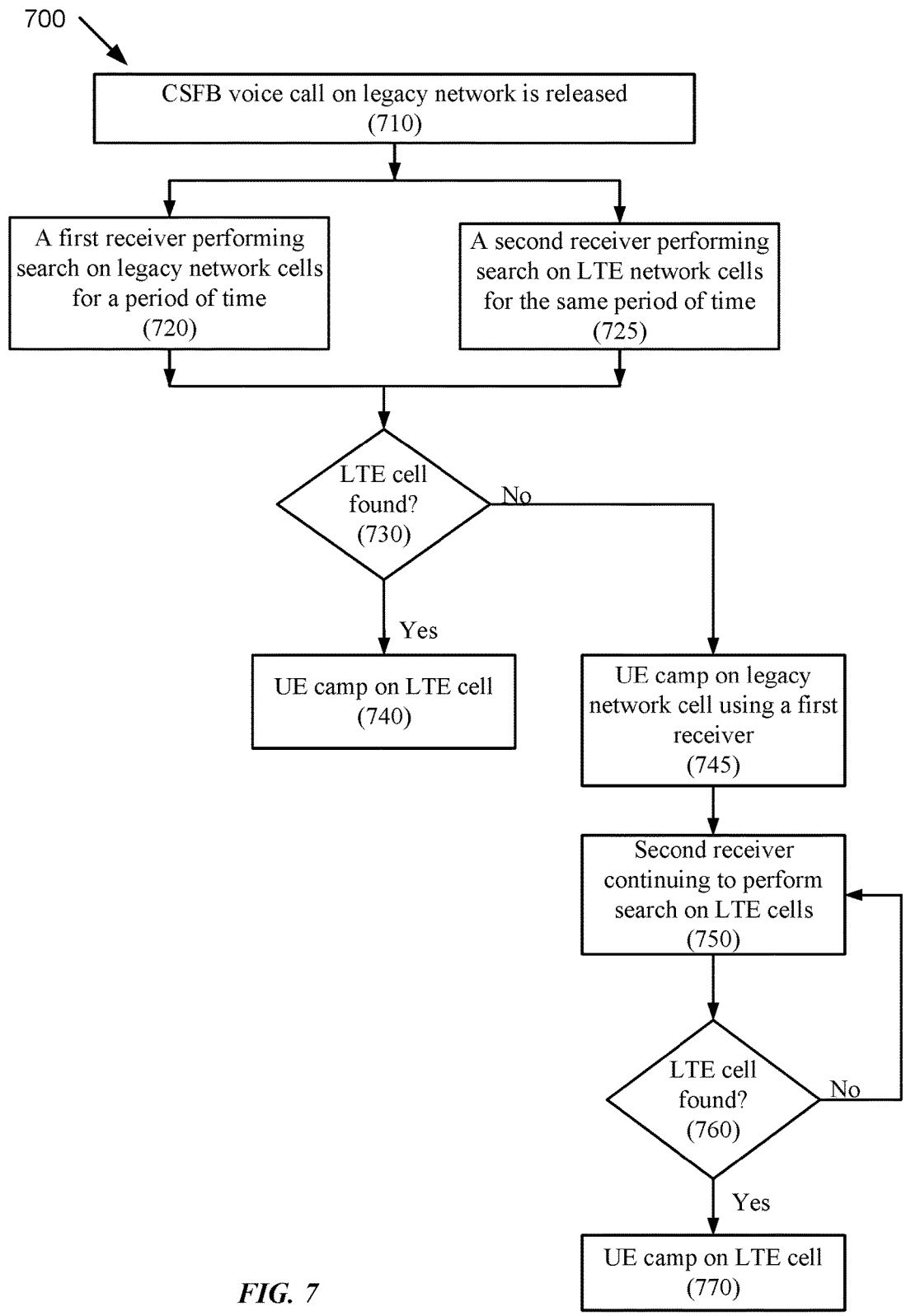
FIG. 7 illustrates a flowchart of a representative method for fast selection of a cell after release of a CSFB voice call on a legacy wireless network, in accordance with some embodiments.

FIG. 7 illustrates a representative method 700 for fast selection of a cell to camp on after a CSFB voice call on a legacy system is released in accordance with some embodiments. An LTE network is a packet data only network. To support a voice call that does not use VoLTE, the LTE specification defines a CSFB mode where, when a MO/MT voice call is initiated, the UE switches from the LTE network to a legacy 3G network, such as a CDMA2000 or UMTS network, for the voice call. After the voice call is released by the 3G network, using an existing 3G procedure for processing either (1) RRC connection release with re-direction, or (2) the UE performs a 3G to LTE reselection to return to the LTE network. There can be two problems associated with this CSFB mode. First, during a cell search that follows after an RRC connection release for a voice call, if the UE searches for an LTE cell first, and then searches for a cell of the 3G network (e.g., UMTS or CDMA2000 1x), then the return from the voice call can take a longer time to camp on the LTE cell if an LTE cell is found. With a long re-camp time, there is a greater chance that a following MT (mobile terminated) page can be missed. Second, as the UE is camped on the LTE network before the voice call, the user can expect that, after the CSFB voice call, the UE will return to the LTE network without much (if any) delay. The user can prefer not to find the UE camped on a 3G network for a period of time after the voice call, and then reselect back to the LTE network.

To solve the above two problems, multiple receivers available for implementing LTE Release 10 carrier aggregation can be utilized. When the CSFB voice call on the UMTS/CDMA2000 network (or other legacy 3G network) is released, a first receiver can be used for cell search on UMTS/CDMA after a normal RRC connection release, while a second receiver can be used for simultaneously searching of LTE cells from a set of stored LTE frequencies (in one RF band or spanning multiple RF bands) before the voice call is established. When an LTE cell is found after a defined period of time, the UE camps on the LTE cell instead of a 3G cell. Otherwise, the UE can camp on a 3G cell as with a normal voice call release. This reduces the probability of missing an MT page. In the meantime, while the UE is idle and camped on a UMTS/CDMA2000 network, the UE can continue to perform an LTE cell search on other frequencies/bands. As soon as a strongest suitable LTE cell is found, the UE can immediately reselect to an LTE cell.

An embodiment of the above solution is shown in FIG. 7. In a first step 710, a CSFB voice call ends, so the CSFB voice call on a legacy network is released. In step 720, a first receiver of the UE performs a search on a set of legacy network cells for a defined period of time. At the same time, in the step 725, a second receiver of the UE performs a search on a set of LTE network cells for the same defined period of time. In step 730, after the defined period of time, the UE determines whether a strongest suitable LTE cell is found. In step 740, when an LTE cell is found, the UE camps on the LTE cell. In step 745, when an LTE cell is not found, the UE camps on a legacy network cell using a first receiver. In step 750, a second receiver continues to perform a search on the set of LTE cells. In step 760, the UE determines whether a strongest suitable LTE cell is found. When an LTE cell is not found, the method returns to step 750, where the second receiver continues to perform a search on the set of LTE cells. When a strongest suitable LTE cell is found, the method proceeds to step 770, and the UE camps on the strongest suitable LTE cell.

Figure 8:
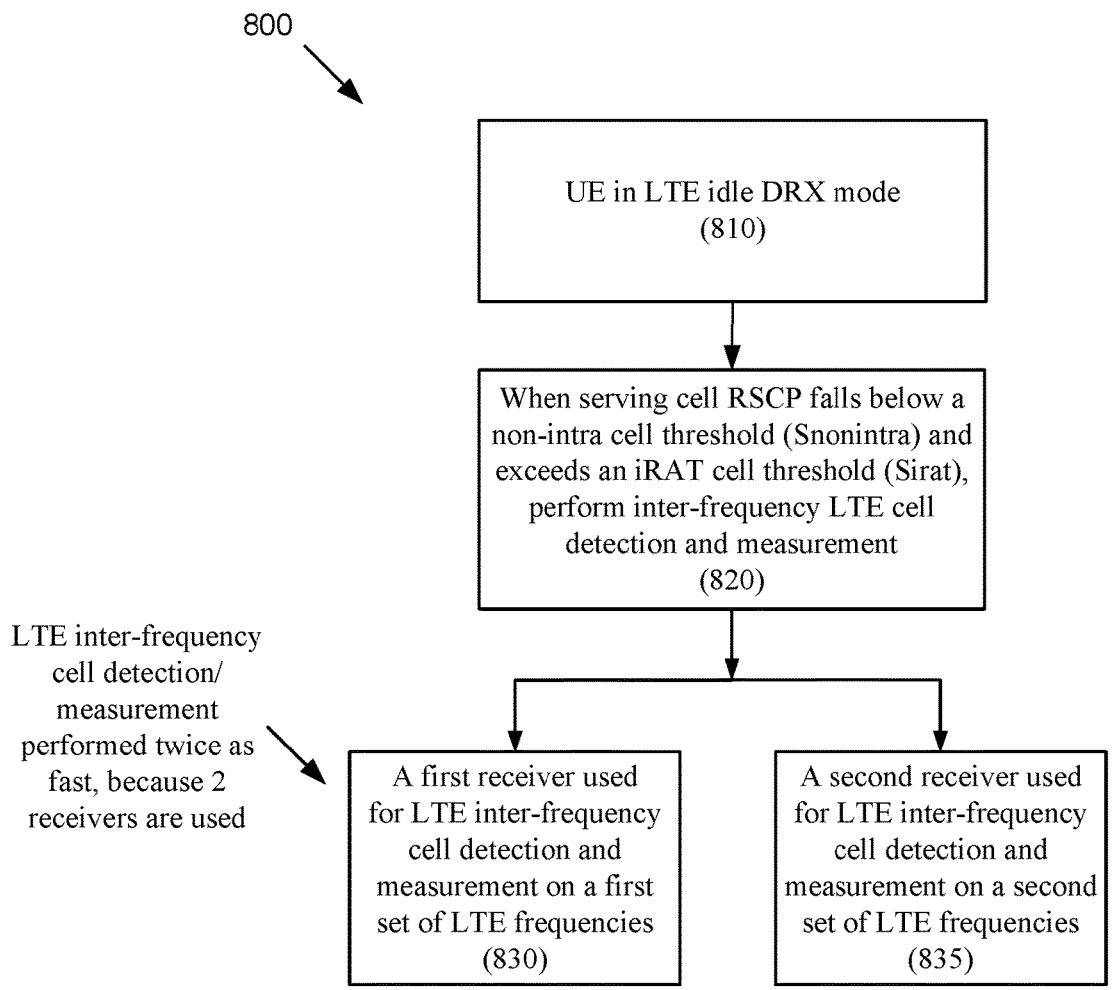
FIG. 8 illustrates a flowchart of a representative method for fast LTE inter-frequency cell detection and measurement for a UE operating in an idle Discontinuous Reception (DRX) mode, in accordance with some embodiments.
Figure 9:
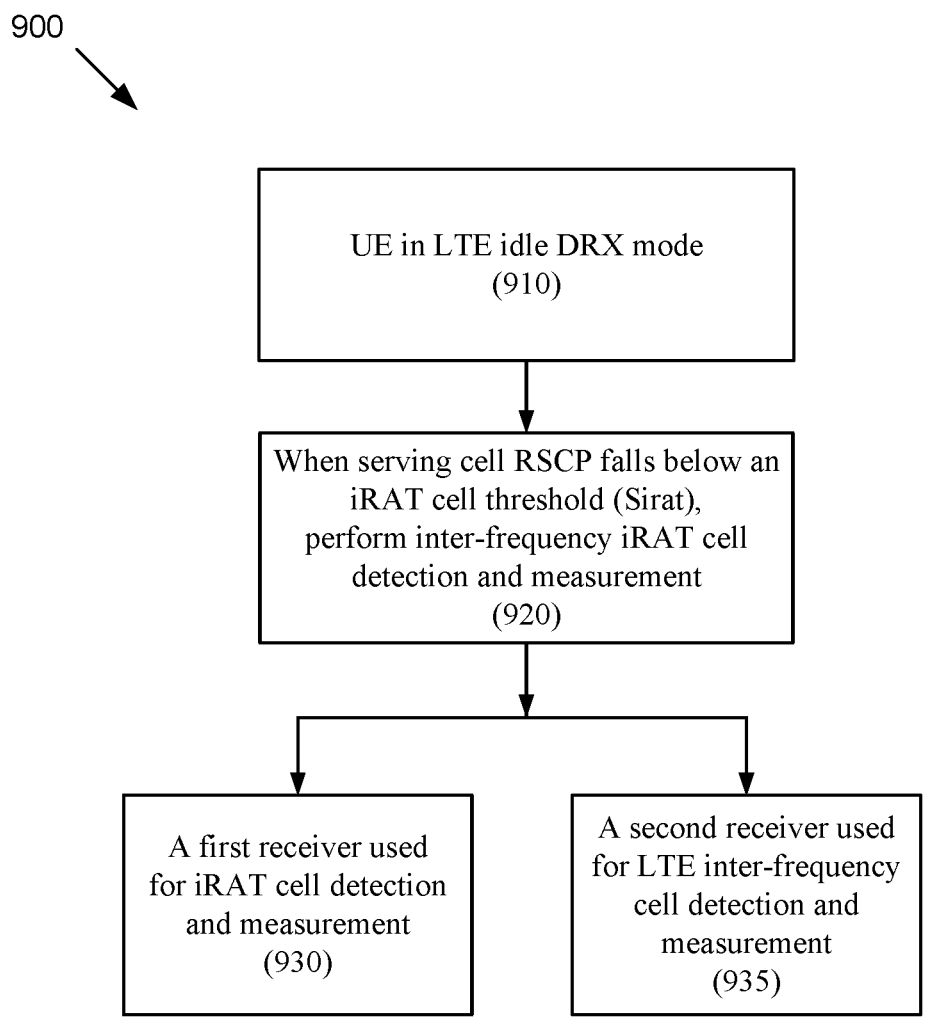
FIG. 9 illustrates a flowchart of a representative method for fast LTE inter-RAT, inter-frequency cell detection and measurement for a UE operating in an LTE idle DRX mode, in accordance with some embodiments.

FIGS. 8 and 9 illustrate representative methods for fast LTE and iRAT (inter-RAT) inter-frequency cell detection and measurement when a UE is in a LTE idle DRX mode in accordance with some embodiments. In LTE idle mode, DRX can be used for saving battery power. During LTE idle DRX mode, the UE can be paged but it does not have an active session. In LTE idle DRX mode, the UE listens only to one paging message during each DRX cycle by monitoring physical downlink control channel (PDCCH) for paging message at certain UE specific paging occasions (e.g., a specific subframe in a specific radio frame) according to DRX configuration. In LTE idle DRX mode, the UE can be required to detect and measure LTE cells across multiple LTE frequency bands, and UMTS/CDMA2000/DO/GSM iRAT (inter-RAT) cells across multiple frequency bands. The Third Generation Partnership Project (3GPP) LTE specification defines a maximum eight frequencies for inter-frequency LTE and iRAT cells to detect and measure during an LTE idle mode. For a UE supporting LTE Release 10 carrier aggregation, multiple receivers (where N=number of receivers) can be utilized to accelerate the LTE inter-frequency and inter-RAT cell detection and measurement, so that the UE wakeup time can be reduced to 1/N for the same period. Alternatively, N times more cell detection/measurement samples can be obtained during the same wakeup time.

For a UE with two receivers, there are two different representative scenarios. In a first representative scenario, when a serving cell signal strength falls below a first threshold, for example, when the serving cell RSCP falls below a non-intra frequency cell threshold (RCSP(S)<Snonintra), both receivers in the UE can be tuned to different LTE frequencies at same time, so inter-frequency cell detection and measurement can be simultaneously performed on two different LTE frequencies. In this scenario, S can represent a serving cell RSCP and Snonintra can represent a non-intra frequency cell threshold. In a second representative scenario, when a serving cell signal strength further falls below a second threshold, for example, serving cell RSCP further falls below an iRAT cell threshold (RSCP(S)<Sirat), a first receiver in the UE can be assigned to detect and measure iRAT cells, while a second receiver in the UE can be used for LTE inter-frequency cell detection and measurement. In this scenario, S can represent a serving cell RSCP and Sirat can represent an iRAT (inter-RAT) cell threshold. The assignment of receivers on each iRAT and LTE inter-frequency can be based on a network assigned iRAT and LTE frequency priority.

FIG. 8 illustrates a representative method 800 for fast LTE inter-frequency cell detection and measurement when a UE is in an LTE idle DRX mode in accordance with some embodiments. FIG. 8 corresponds to the first representative scenario for a UE with two receivers when a serving cell RSCP falls below a first threshold and exceeds a second threshold (e.g., when Sirat<RSCP(S)<Snonintra). In a first step 810, a UE is in an LTE idle DRX (Discontinuous Reception) mode. In step 820, when a serving cell RSCP falls below a LTE non-intra cell threshold (e.g., RSCP(S) <Snonintra) and exceeds an iRAT cell threshold (e.g., RSCP (S)>Sirat) the UE performs inter-frequency LTE cell detection and measurement. Next, in the step 830, a first receiver of the UE is used for LTE inter-frequency cell detection and measurement on a first set of LTE frequencies. At the same time, in the step 835, a second receiver of the UE is used for LTE inter-frequency cell detection and measurement on a second set of LTE frequencies different from the first set of LTE frequencies. The UE selects a serving LTE cell based on the LTE inter-frequency cell detection and measurement data for the first set and the second set of LTE frequencies. As the first receiver and the second receiver are tuned to different LTE frequencies at same time, the LTE inter-frequency cell detection and measurement can be performed twice as fast as when only one receiver is used. Similarly, if N receivers are used for detection and measurement concurrently, the detection and measurement time is effectively reduced by a factor of 1/N.

FIG. 9 illustrates a representative method 900 for fast LTE and iRAT inter-frequency cell detection and measurement when UE is in an LTE idle DRX mode in accordance with some embodiments. FIG. 9 corresponds to the second representative scenario for a UE with two receivers when a serving cell RSCP falls below the second threshold (e.g., RSCP(S)<Sirat). In a first step 910, a UE is in an LTE idle DRX mode. In step 920, when a serving cell RSCP falls below an iRAT cell threshold (Sirat), the UE performs inter-frequency iRAT cell detection and measurement. Next, in the step 930, a first receiver of the UE (e.g., the wireless communication device 202) can be used for iRAT cell detection and measurement. At the same time, in the step 935, a second receiver of the UE (e.g., the wireless communication device 202) can be used for LTE inter-frequency cell detection and measurement. The UE can select a serving cell based on LTE inter-frequency cell detection and measurement and the iRAT cell detection and measurement data. As the iRAT and LTE inter-frequency cell detection and measurement are performed in parallel concurrently, the total detection and measurement time is accordingly reduced.

Representative applications of methods and apparatus according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

Software, hardware, or a combination of hardware and software can implement various aspects of the described embodiments. The described embodiments can also be encoded as computer program code and/or instructions on a non-transitory computer-readable medium. The non-transitory computer-readable medium is any data storage device that can store data that can thereafter be read by a computer system. Examples of the non-transitory computer-readable medium include read-only memory, random-access memory, CD-ROMs, DVDs, magnetic tape and optical data storage devices. The computer program code and/or instructions can also be distributed over network-coupled computer systems so that the computer program code and/or instructions are stored and executed in a distributed fashion.

The various aspects, embodiments, implementations or features of the described embodiments can be used separately or in any combination. The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

The advantages of the embodiments described are numerous. Different aspects, embodiments or implementations can yield one or more of the following advantages. Many features and advantages of the present embodiments are apparent from the written description and, thus, it is intended by the appended claims to cover all such features and advantages of the invention. Further, since numerous modifications and changes will readily occur to those skilled in the art, the embodiments should not be limited to the exact construction and operation as illustrated and described. Hence, all suitable modifications and equivalents can be resorted to as falling within the scope of the invention.

What is claimed is:

1. An apparatus configurable for operation in a wireless device, the apparatus comprising:
one or more processors communicatively coupled to a storage medium storing instructions that, when executed by the one or more processors, cause the wireless device to:
search concurrently a first set of cells associated with a first radio access technology (RAT) using a first receiver and a second set of cells associated with a second RAT using a second receiver;
generate a list of candidate frequencies for cell acquisition; and
select a cell on which to camp using the list of candidate frequencies for cell acquisition,
wherein the first set of cells of the first RAT operate on radio frequency bands that differ from radio frequency bands on which the second set of cells of the second RAT operate such that radio frequency bands of the second set of cells searched using the second receiver are distinct from radio frequency bands of the first set of cells searched using the first receiver.

2. The apparatus of claim 1, wherein the wireless device selects the cell on which to camp using the list of candidate frequencies by at least:
obtaining at least one performance metric for each candidate frequency in the list of candidate frequencies; and
selecting the cell based on a set of performance metrics obtained for the list of candidate frequencies.

3. The apparatus of claim 2, wherein the at least one performance metric includes a signal strength or a signal quality.

4. The apparatus of claim 1, wherein execution of the instructions further causes the wireless device to:
search a third set of cells associated with a third RAT using a third receiver,
wherein the third set of cells of the third RAT operate in radio frequency bands different from the radio frequency bands of either the first set of cells of the first RAT or the second set of cells of the second RAT.

5. The apparatus of claim 1, wherein execution of the instructions further causes the wireless device to:
search concurrently the first set of cells associated with the first RAT using both the first receiver and a third receiver.

6. The apparatus of claim 1, wherein:
the second RAT has a higher priority than the first RAT, and the wireless device searches concurrently the second set of cells associated with the second RAT using the second receiver and a third receiver.

7. The apparatus of claim 1, wherein the first receiver and the second receiver are configurable for carrier aggregation, in Long Term Evolution (LTE) connected mode, using multiple carriers simultaneously to aggregate multiple radio frequency bands to increase a downlink data rate.

8. The apparatus of claim 1, wherein:
the first RAT comprises a legacy RAT;
the second RAT comprises a Long Term Evolution (LTE) RAT;
the wireless device searches the first set of cells and the second set of cells concurrently following release of a Circuit Switched Fallback (CSFB) voice call on a legacy network, and execution of the instructions further causes the wireless device to:
camp on a cell of the legacy network using the first receiver, when the search is unable to locate an LTE cell for cell acquisition;
continue to search for LTE cells using the second receiver while camped on the legacy network; and
camp on a located LTE cell when found by the continuing search.

9. An apparatus configurable for operation in a wireless device, the apparatus comprising:
one or more processors communicatively coupled to a storage medium storing instructions that, when executed by the one or more processors, cause the wireless device to:
search concurrently a first set of cells of a legacy network using a first receiver of the wireless device and a second set of cells of a Long Term Evolution (LTE) network using a second receiver of the wireless device following release of a Circuit Switched Fallback (CSFB) voice call on the legacy network;
generate a list of candidate frequencies for cell acquisition;
select an LTE cell on which to camp when finding at least one LTE cell in the list of candidate frequencies for cell acquisition; and
continue to search for LTE cells using the second receiver while camped on a legacy cell using the first receiver when unable to find at least one LTE cell in the list of candidate frequencies for cell acquisition,
wherein the second set of cells of the legacy network operate on radio frequency bands that differ from radio frequency bands on which the first set of cells of the LTE network operate such that radio frequency bands of the legacy network searched by the second receiver are distinct from radio frequency bands of the LTE network searched by the first receiver.

10. The apparatus of claim 9, wherein the wireless device generates the list of candidate frequencies for cell acquisition by at least:
obtaining at least one performance metric for each candidate frequency in the list of candidate frequencies; and
selecting the LTE cell on which to camp based on a set of performance metrics obtained for the list of candidate frequencies.

11. The apparatus of claim 10, wherein the at least one performance metric includes a signal strength or a signal quality and execution of the instructions further causes the wireless device to:

select the LTE cell using the candidate frequency in the list of candidate frequencies having a highest value for the signal strength or the signal quality.

12. The apparatus of claim 11, wherein the signal strength comprises one or more of:
a received signal strength indicator (RSSI),
a received signal code power (RSCP), or
a reference signal received power (RSRP).

13. The apparatus of claim 11, wherein the signal quality comprises one or more of:
a signal to interference plus noise ratio (SINR), or
a reference signal received quality (RSRQ).

14. The apparatus of claim 9, wherein execution of the instructions further causes the wireless device to concurrently search a third set of cells of the LTE network using a third receiver to accelerate the search for LTE cells following release of the CSFB voice call or during the continuing search while camped on the legacy cell.

15. The apparatus of claim 9, wherein the legacy network uses a radio access technology (RAT) comprising one or more of:
wideband code division multiple access (WCDMA),
CDMA2000,
universal mobile telecommunications system (UMTS), or
global system for mobile communications (GSM).

16. An apparatus configurable for operation in a wireless device, the apparatus comprising:
one or more processors communicatively coupled to a storage medium storing instructions that, when executed by the one or more processors, cause the wireless device to:
determine a received signal code power (RSCP) of a serving Long Term Evolution (LTE) cell; and
when the RSCP of the present serving LTE cell falls below a first threshold and exceeds a second threshold:
perform an LTE inter-frequency cell detection and measurement procedure concurrently for a first set of LTE cells using a first receiver and for a second set of LTE cells using a second receiver; and
select a new serving LTE cell based on LTE inter-frequency cell detection and measurement data obtained for the first set of LTE cells and the second set of LTE cells,
wherein radio frequency bands on which the first set of LTE cells operates differ from radio frequency bands on which the second set of LTE cells operates such that the radio frequency bands of the LTE cells searched by the first receiver are non-overlapping with the radio frequency bands of the LTE cells searched by the second receiver.

17. The apparatus of claim 16, wherein execution of the instructions further causes the wireless device to:
when the RSCP of the present serving LTE cell falls below the second threshold:
perform concurrently the LTE inter-frequency cell detection and measurement for the first set of LTE cells using the first receiver and an inter-RAT (iRAT) inter-frequency cell detection and measurement for a second set of cells using the second receiver; and
select the new serving LTE cell based on LTE inter-frequency cell detection and measurement data obtained for the first set of LTE cells and iRAT inter-frequency cell detection and measurement data obtained for the second set of cells.

18. The apparatus of claim 17, wherein execution of the instructions further causes the wireless device to:

detect and measure iRAT cells across multiple frequency bands, when the wireless device is in a LTE idle discontinuous reception (DRX) mode.

19. The apparatus of claim 16, wherein execution of the instructions further causes the wireless device to:

detect and measure neighboring LTE cells across multiple LTE frequency bands, when the wireless device is in a LTE idle DRX mode.

20. The apparatus of claim 16, wherein the wireless device measures the first and second sets of LTE cells by at least measuring a signal strength or a signal quality.

* * * * *